United States Patent
Chang

(10) Patent No.: US 10,116,047 B1
(45) Date of Patent: Oct. 30, 2018

(54) ANTENNA DEVICE AND COMMUNICATION DEVICE

(71) Applicant: AMBIT MICROSYSTEMS (SHANGHAI) LTD., Shanghai (CN)

(72) Inventor: Wei-Jen Chang, New Taipei (TW)

(73) Assignee: AMBIT MICROSYSTEMS (SHANGHAI) LTD., Shanghai (CN)

( * ) Notice: Subject to any disclaimer, the term of this patent is extended or adjusted under 35 U.S.C. 154(b) by 0 days.

(21) Appl. No.: 15/636,577

(22) Filed: Jun. 28, 2017

(51) Int. Cl.
| | |
|---|---|
| *H01Q 1/38* | (2006.01) |
| *H01Q 1/24* | (2006.01) |
| *H04M 1/23* | (2006.01) |
| *H01Q 9/30* | (2006.01) |
| *H01Q 9/04* | (2006.01) |
| *H01Q 3/24* | (2006.01) |

(52) U.S. Cl.
CPC .............. *H01Q 1/38* (2013.01); *H01Q 1/24* (2013.01); *H01Q 1/243* (2013.01); *H01Q 3/24* (2013.01); *H01Q 9/0421* (2013.01); *H01Q 9/30* (2013.01); *H04M 1/233* (2013.01)

(58) Field of Classification Search
CPC .. H01Q 1/38; H01Q 1/24; H01Q 3/24; H01Q 9/04; H01Q 9/30

USPC ........................................................ 343/845
See application file for complete search history.

(56) References Cited

U.S. PATENT DOCUMENTS

| | | | | |
|---|---|---|---|---|
| 2011/0057852 A1* | 3/2011 | Holland | ................... | H01Q 9/28 343/795 |
| 2014/0315606 A1* | 10/2014 | You | ...................... | H04B 1/3838 455/575.5 |

FOREIGN PATENT DOCUMENTS

CN 103904414 A 7/2014

* cited by examiner

*Primary Examiner* — Andrea Lindgren Baltzell
(74) *Attorney, Agent, or Firm* — ScienBiziP, P.C.

(57) ABSTRACT

An antenna device includes a first antenna and a second antenna. The first antenna and the second antenna are disposed in a PCB to radiate signals. The first antenna includes a first ground portion, a first short portion and a first feeding part. The first short portion and the first ground portion are electrically coupled together to form a first storage space. Further, THE first storage space has a first notch. The first feeding part is disposed in the first storage space. The first feeding part and the first short portion are not contacted through any metallic conductors. The first feeding part and the first ground portion are not contacted through any metallic conductors. A communication device is also provided.

16 Claims, 4 Drawing Sheets

ANTENNA DEVICE AND COMMUNICATION DEVICE

FIELD

The subject matter herein generally relates to wireless communication field, particularly relates to an antenna device and a communication device.

BACKGROUND

As thin and short communication devices become popular, developers have to design communication system within limited spaces. For example, developers have to design communication system with a plurality of antennas in a small space. However, when two antennas are designed in a same small space, if isolation between the two antennas is not good enough, interference between the two antennas would be large. Thus, signals transmission is affected. Transmission rate is decreased as well. Moreover, it is easy to generate current interference at an edge of the ground when two antennas are disposed in two sides of the ground. Improvement in the art is preferred.

BRIEF DESCRIPTION OF THE DRAWING

Implementations of the present disclosure will now be described, by way of example only, with reference to the attached figures, wherein.

DETAILED DESCRIPTION

Figure 1:
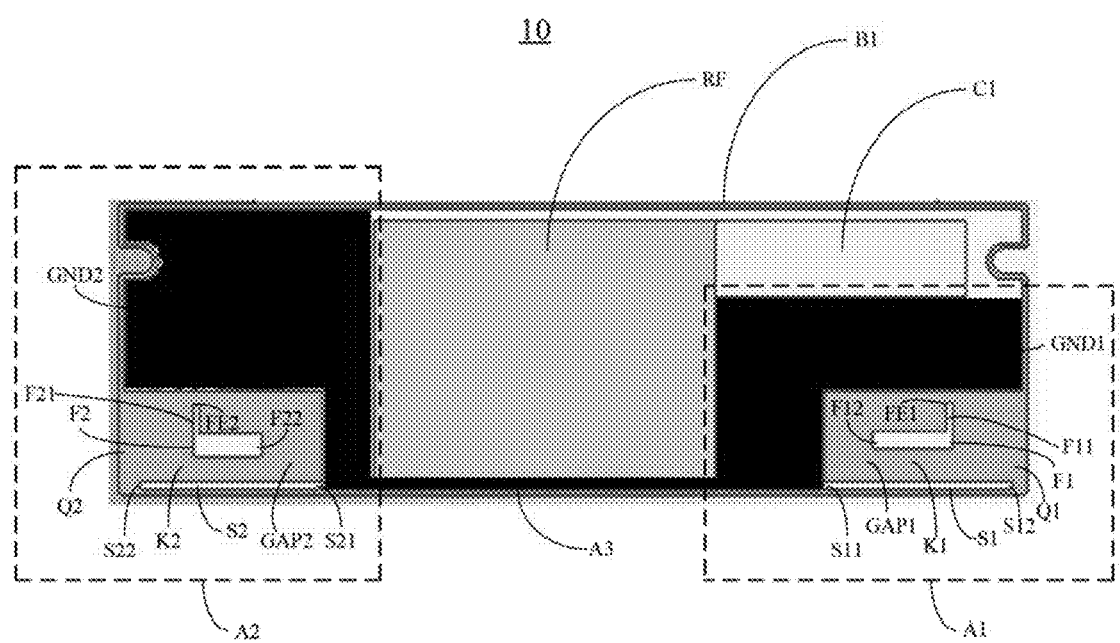
FIG. 1 is a diagram illustrating an exemplary embodiment of a communication device.

It will be appreciated that for simplicity and clarity of illustration, where appropriate, reference numerals have been repeated among the different figures to indicate corresponding or analogous elements. In addition, numerous specific details are set forth to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale, and the proportions of certain parts have been exaggerated to illustrate details and features of the present disclosure better. The disclosure is illustrated by way of example and not by way of limitation in the figures of the accompanying drawings in which like references indicate similar elements. It should be noted that references to "an" or "one" exemplary embodiment in this disclosure are not necessarily to the same exemplary embodiment, and such references mean at least one.

Several definitions that apply throughout this disclosure will now be presented. The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

FIG. 1 is a diagram illustrating an exemplary embodiment of a communication device 10.

In the exemplary embodiment, the communication device 10 is configured to wireless communication. The communication device 10 comprises an antenna device, a radio frequency circuit RF and a signal interface C1. The radio frequency circuit RF is disposed in the printed circuit board (PCB) B1. The radio frequency circuit RF is configured to process wireless communication signals. In the exemplary embodiment, processing the wireless communication signals comprises sending and receiving the wireless communication signals, modulating the wireless communication signals and so on. The signal interface C1 is electrically coupled to the radio frequency circuit RF. The signal interface C1 is configured to connect to other communication equipment to acquire powers. Further, the signal interface C1 is configured to connect to other communication equipment to transmit the wireless communication signals with the other communication equipment. For example, the other communication equipment is a network television.

Figure 2:
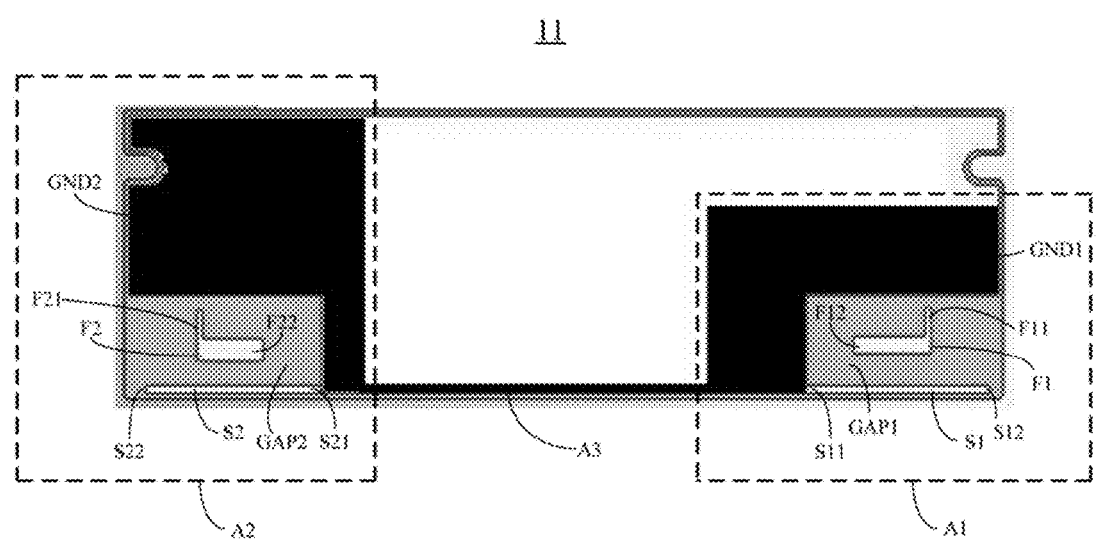
FIG. 2 is a diagram illustrating an exemplary embodiment of an antenna device.

FIG. 2 is a diagram illustrating an exemplary embodiment of an antenna device 11.

The antenna device 11 is mainly working in Institute of Electrical and Electronics Engineers (IEEE) 802.11 a/b/g/n/ac frequency bands. The antenna device 11 comprises a first antenna A1 and a second antenna A2. The first antenna A1 and the second antenna A2 are both disposed in the PCB B1 to radiate signals.

In the exemplary embodiment, the first antenna A1 and the second antenna A2 are disposed in different spaces of the PCB B1. Spaces between the first antenna A1 and the second antenna A2 is very small, special designed structure in the first antenna A1 and the second antenna A2 to improve isolation is necessary. Thus, the interference between the first antenna A1 and the second antenna A2 can be avoided. A ground conduction current between the first antenna A1 and the second antenna A2 can decrease.

Referring to FIGS. 1-2, the first antenna A1 comprises a first ground portion GND1, a first short portion S1 and a first feeding part F1. The first ground portion GND1 is mainly electrically coupled to other ground connection points. In the exemplary embodiment, the first ground portion GND1 can be electrically coupled to other ground connection points in other devices through some conductors, thus, the first antenna A1 can have the same grounding with other devices. The first short portion S1 and the first ground portion GND1 are electrically coupled together to form a first storage space K1. Further, the first storage space K1 has a first notch Q1. In the exemplary embodiment, a first short portion first terminal S11 is electrically coupled to a corner of the first ground portion GND1. A first short portion second terminal S12 is hanging in the air, thus the first storage space K1 with the first notch Q1 is formed. The first short portion S1 has an elongated shape. In other exemplary embodiments, the first short portion S1 can have other shapes to form a storage space. A shape of the first short portion S1 can be changed according to the specific storage space size requirement.

The first feeding part F1 is disposed in the first storage space K1. The first feeding part F1 guides induced current generated in the first ground portion GND1 and the first short portion S1 to a specific space. In the exemplary embodiment, because the induced current in the first ground portion GND1 and the first short portion S1 need not flow through the first feeding part F1, the first feeding part F1 and the first short portion S1 are not contacted through any metallic conductors, the first feeding part F1 and the first ground portion GND1 are not contacted through any metallic conductors. The first feeding part F1, the first ground portion GND1, and the first short portion S1 form a first gap GAP1.

In the exemplary embodiment, the first feeding part F1 has an L shape. A first feeding part first line F11 has an elongated shape. A first terminal of the first feeding part first line F11 is a first feeding point FE1 for inputting signals. A first feeding part second line F12 is also an elongated shape. A second terminal of the first feeding part first line F11 is electrically coupled to the first feeding part second line F12. The first feeding part second line F12 is perpendicular to the first feeding part first line F11.

The second antenna A2 comprises a second ground portion GND2, a second short portion S2, and a second feeding part F2. The second ground portion GND2 is mainly electrically coupled to other ground connection points. In the exemplary embodiment, the second ground portion GND2 can be electrically coupled to other ground connection points in other devices through some conductors, thus, the first antenna A1 can have the same grounding with other devices. The second short portion S2 and the second ground portion GND2 are electrically coupled together to form a second storage space K2. The second storage space K2 has a second notch Q2. In the exemplary embodiment, a second short portion first terminal S21 is electrically coupled to a corner of the second ground portion GND2. A second short portion second terminal S22 is also hanging in the air. Thus, the second storage space K2 with the second notch Q2 is formed. In the exemplary embodiment, the second short portion S2 is an elongated shape. In other exemplary embodiments, a shape of the second short portion S2 can be changed according to the specific storage space size requirement.

The second feeding part F2 is disposed in the second storage space K2. The second feeding part F2 guides induced current generated in the second ground portion GND2 and the second short portion S2 to a specific space. In the exemplary embodiment, because the induced current in the second ground portion GND2 and the second short portion S2 needs not to flow through the second feeding part F2, the second feeding part F2 just need to guide the induced current. Thus, the second feeding part F2 and the second short portion S2 are not contacted through any metallic conductors, the second feeding part F2 and the second ground portion GND2 are not contacted through any metallic conductors. The second feeding part F2, the second ground portion GND2, and the second short portion S2 form a second gap GAP2. An exemplary embodiment shown in FIG. 3 would describe how the first feeding part F1 and the second feeding part F2 guide induced current.

In the exemplary embodiment, the second feeding part F2 has an L shape. A second feeding part first line F21 has an elongated shape. A first terminal of the second feeding part first line F21 is a second feeding point FE2 for inputting signals. A second feeding part second line F22 also has an elongated shape. A second terminal of the second feeding part first line F21 is electrically coupled to the second feeding part second line F22. The second feeding part second line F22 is perpendicular to the second feeding part first line F21. The first feeding part first line F11 is parallel to the second feeding part first line F21. The first feeding part second line F12 is parallel to the second feeding part second line F22. A width of the first feeding part second line F12 is larger than a width of the second feeding part second line F22. The antenna device 11 further comprises a connection part A3. The connection part A3 is electrically coupled to the first ground portion GND1 and the second ground portion GND2. Thus, the first ground portion GND1 and the second ground portion GND2 together form a single grounding electrically coupled by the connection part A3. In the exemplary embodiment, the first feeding part F1 and the second feeding part F2 are mainly configured to adjust a resonant frequency in a high frequency band of the antenna device 11. The first short portion S1 and the second short portion S2 are mainly configured to adjust a resonant frequency in a low frequency band of the antenna device 11. The longer the lengths of the first feeding part F1, the second feeding part F2, the antenna device 11, the first short portion S1, and the second short portion S2, the lower the resonant frequency of the antenna device 11. The shorter the lengths of the first feeding part F1, the second feeding part F2 the antenna device 11, the first short portion S1, and the second short portion S2, the higher the resonant frequency of the antenna device 11.

Figure 3A:
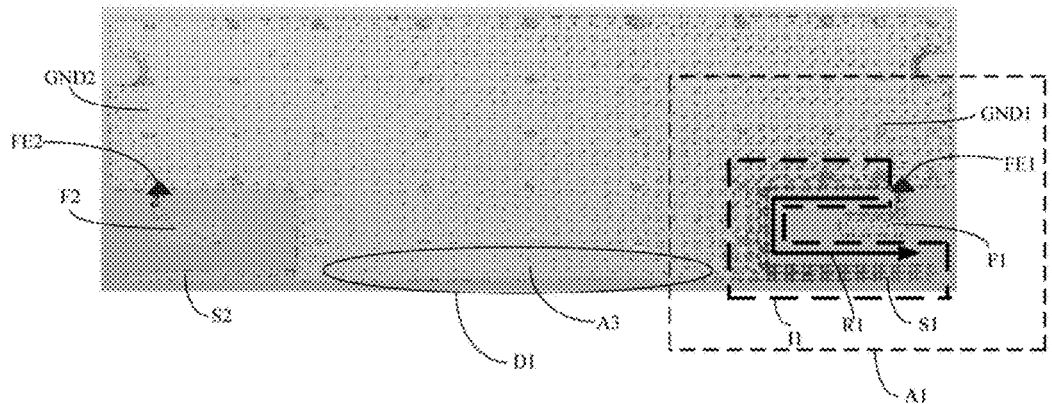
FIGS. 3a and 3b are diagrams illustrating current measurement diagrams of an exemplary embodiment of an antenna device.
Figure 3B:
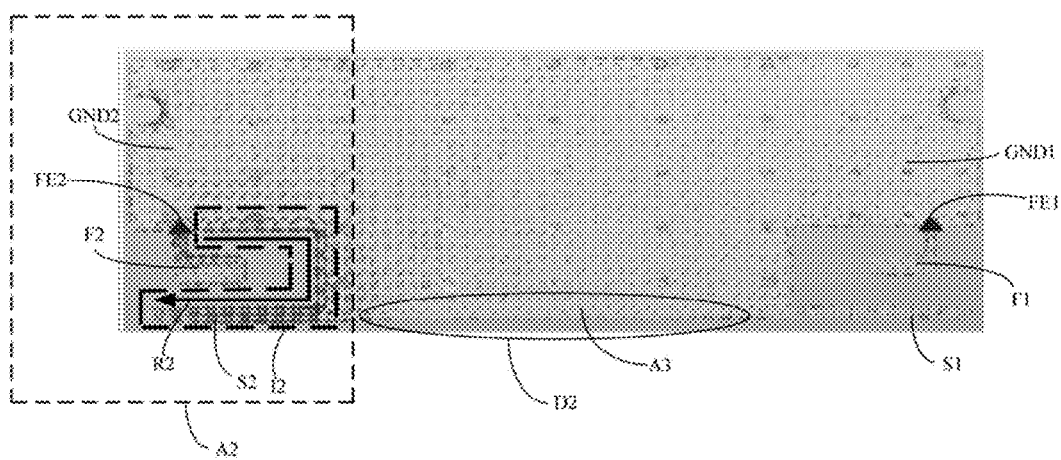

FIGS. 3a and 3b are diagrams illustrating current measurement diagrams of an exemplary embodiment of an antenna device 11. As shown in FIG. 3a, when signals input from the first feeding point FE1, the induced current I1 in the first antenna A1 is almost gathered in the first ground portion GND1 and the first short portion S1. Moreover, the induced current I1 is almost gathered along edges of the first storage space K1. As we can see from the arrows in the first antenna A1 in FIG. 3a, when signals input from the first feeding point FE1, under guidance of the first feeding part F1, the induced current I1 flows in an anti-clockwise direction along the edges of the first storage space K1. Thus, a first current route R1 is formed. As the current measurement diagram shown in FIG. 3, a conduction current D1 generated in the connection part A3 is far less than the induced current I1.

As shown in FIG. 3b, when signals input from the second feeding point FE2, the induced current I2 in the second antenna A2 is almost gathered in the second ground portion GND2 and the second short portion S2. Moreover, the induced current I2 is almost gathered along edges of the second storage space K2. As we can see from the arrows in the second antenna A2 in FIG. 3b, when signals input from the second feeding point FE2, under guidance of the second feeding part F2, the induced current I2 flows in a clockwise direction along the edges of the second storage space K2. Thus, a second current route R2 is formed. As the current measurement diagram shown in FIG. 3, a conduction current D2 generated in the connection part A3 is far less than the induced current I2. The conduction currents D1 and D2 are edge currents of the single grounding. The edge currents of the single grounding would lead current interference in the antenna device 11. The antenna device 11 can decrease the conduction currents D1 and D2. Thus, the current interference in the antenna device 11 can decrease.

Lengths of the first current route R1 and the second current route R2 can approximately be set to half of signals wave lengths. In the exemplary embodiment, a signal wave length is approximately 62.5 millimeters. The first current route R1 and the second current route R2 can be set to 29.76 millimeters.

Figure 4:
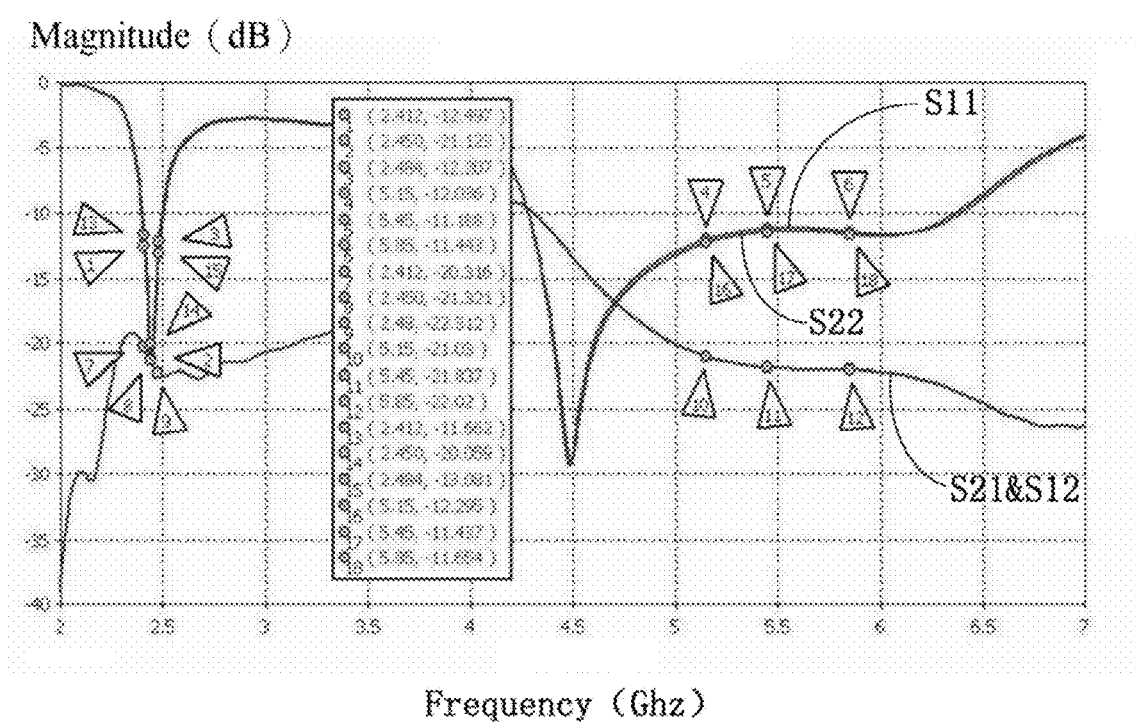
FIG. 4 is a diagram illustrating a scattering parameter measurement diagram of an exemplary embodiment of an antenna device.

FIG. 4 illustrates a scattering parameter measurement diagram of an exemplary embodiment of an antenna device 11.

As shown in FIG. 4, scattering parameter curves S11 and S22 are almost overlapping. Scattering parameter curves S21 and S12 are almost completely overlapping. Scattering parameter measurement points are shown in FIG. 4. For example, an abscissa of a first measurement point in a curve is 2.142 GHz, an ordinate of a first measurement point in a curve is −12.497 dB. When an abscissa is 2.45 GHz, the isolation shown in curves S21 and S12 is −21.32 dB. When an abscissa is 5.45 GHz, the isolation shown in curves S21 and S12 is −21.83 dB. Therefore, comparing with those antennas only with −10 dB isolation, the antenna device 11 has a better performance. The communication device 10 and the antenna device 11 are beneficial to decrease in ground edge current interference. Further, the communication device 10 and the antenna device 11 are also beneficial in improving isolation between two antennas.

Many details are often found in art including other features of the filter. Therefore, many such details are neither shown nor described. Even though numerous characteristics and advantages of the present disclosure have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will, therefore, be appreciated that the exemplary embodiments described above may be modified within the scope of the claims.

What is claimed is:

1. An antenna device, comprising:
    a first antenna, wherein the first antenna is disposed in a PCB to radiate signals;
    a second antenna, wherein the second antenna is disposed in the PCB to radiate the signals;
    wherein the first antenna comprises:
        a first ground portion;
        a first short portion, wherein the first short portion and the first ground portion are electrically coupled together to form a first storage space, the first storage space has a first notch; and
        a first feeding part, wherein the first feeding part is disposed in the first storage space, the first feeding part and the first short portion are not contacted through any metallic conductors, the first feeding part and the first ground portion are not contacted through any metallic conductors.

2. The antenna device of claim 1, wherein the second antenna comprises:
    a second ground portion;
    a second short portion, wherein the second short portion and the second ground portion are electrically coupled together to form a second storage space, the second storage space has a second notch; and
    a second feeding part, wherein the second feeding part is disposed in the second storage space, the second feeding part and the second short portion are not contacted through any metallic conductors, the second feeding part and the second ground portion are not contacted through any metallic conductors.

3. The antenna device of claim 2, wherein the first feeding part and the second feeding part are L shaped.

4. The antenna device of claim 2, wherein a first feeding part first line has an elongated shape; a second feeding part first line is elongated shaped; a first terminal of the first feeding part first line is a first feeding point for inputting the signals; a first terminal of the second feeding part first line is a second feeding point for inputting the signals; and the first feeding part first line is parallel to the second feeding part first line.

5. The antenna device of claim 4, wherein a first feeding part second line is elongated shaped; a second feeding part second line is elongated shaped; the second feeding part second line is perpendicular to the second feeding part first line; the first feeding part second line is perpendicular to the first feeding part first line; and the first feeding part second line is parallel to the second feeding part second line.

6. The antenna device of claim 5, wherein when the signals input from the first feeding point, under guidance of the first feeding part, induced current flows in an anti-clockwise direction along edges of the first storage space, the edges of the first storage space forms a first current route; and when the signals input from the second feeding point, under guidance of the second feeding part, induced current flows in a clockwise direction along edges of the second storage space, the edges of the second storage space forms a second current route.

7. The antenna device of claim 5, wherein a width of the first feeding part second line is larger than a width of the second feeding part second line.

8. The antenna device of claim 1, wherein the antenna device further comprises a connection part, the first ground portion and the second ground portion together form a single grounding electrically coupled by the connection part.

9. A communication device, applied in wireless communication, wherein the communication device comprises:
    a radio frequency circuit, wherein the radio frequency circuit is disposed in a PCB, the radio frequency circuit is configured to process the wireless communication signals;
    a signal interface, wherein the signal interface is electrically coupled to the radio frequency circuit, the signal interface is further electrically coupled to other communication equipment to acquire powers, the signal interface is further electrically coupled to the other communication equipment to transmit the wireless communication signals with the other communication equipment; and
    an antenna device, comprising:
        a first antenna, wherein the first antenna is disposed in a PCB to radiate the wireless communication signals;
        a second antenna, wherein the second antenna is disposed in the PCB to radiate the wireless communication signals;
        wherein the first antenna comprises:
            a first ground portion;
            a first short portion, wherein the first short portion and the first ground portion are electrically coupled together to form a first storage space, the first storage space has a first notch; and
            a first feeding part, wherein the first feeding part is disposed in the first storage space, the first feeding part and the first short portion are not contacted through any metallic conductors, the first feeding part and the first ground portion are not contacted through any metallic conductors.

10. The communication device of claim 9, wherein the second antenna comprises:
    a second ground portion;

a second short portion, wherein the second short portion and the second ground portion are electrically coupled together to form a second storage space, the second storage space has a second notch; and a second feeding part, wherein the second feeding part is disposed in the second storage space, the second feeding part and the second short portion are not contacted through any metallic conductors, the second feeding part and the second ground portion are not contacted through any metallic conductors.

11. The communication device of claim 10, wherein the first feeding part and the second feeding part are L shaped.

12. The communication device of claim 10, wherein a first feeding part first line is elongated shaped; a second feeding part first line is elongated shaped; a first terminal of the first feeding part first line is a first feeding point for inputting the wireless communication signals; a first terminal of the second feeding part first line is a second feeding point for inputting the wireless communication signals; and the first feeding part first line is parallel to the second feeding part first line.

13. The communication device of claim 12, wherein a first feeding part second line is elongated shaped; a second feeding part second line is elongated shaped; the second feeding part second line is perpendicular to the second feeding part first line; the first feeding part second line is perpendicular to the first feeding part first line; and the first feeding part second line is parallel to the second feeding part second line.

14. The communication device of claim 13, wherein when the wireless communication signals input from the first feeding point, under guidance of the first feeding part, induced current flows in an anti-clockwise direction along edges of the first storage space, the edges of the first storage space forms a first current route; and when the wireless communication signals input from the second feeding point, under guidance of the second feeding part, induced current flows in a clockwise direction along edges of the second storage space, the edges of the second storage space forms a second current route.

15. The communication device of claim 13, wherein a width of the first feeding part second line is larger than a width of the second feeding part second line.

16. The communication device of claim 9, wherein the antenna device further comprises a connection part, the first ground portion and the second ground portion together form a single grounding electrically coupled by the connection part.

* * * * *